United States Patent
Xu et al.

(10) Patent No.: US 10,901,797 B2
(45) Date of Patent: Jan. 26, 2021

(54) RESOURCE ALLOCATION

(71) Applicant: International Business Machines Corporation, Armonk, NY (US)

(72) Inventors: Qing Xu, Beijing (CN); Yi Shan Jiang, Beijing (CN); Zhi Xiong Pan, Beijing (CN); Ting Ting Wen, Beijing (CN)

(73) Assignee: International Business Machines Corporation, Armonk, NY (US)

(*) Notice: Subject to any disclaimer, the term of this patent is extended or adjusted under 35 U.S.C. 154(b) by 70 days.

(21) Appl. No.: 16/182,046

(22) Filed: Nov. 6, 2018

(65) Prior Publication Data

US 2020/0142741 A1 May 7, 2020

(51) Int. Cl.
*G06F 9/46* (2006.01)
*G06F 9/50* (2006.01)
*H04L 29/08* (2006.01)

(52) U.S. Cl.
CPC ........ *G06F 9/505* (2013.01); *G06F 2209/501* (2013.01); *H04L 67/10* (2013.01)

(58) Field of Classification Search
CPC ..... G06F 9/505; G06F 2209/501; H04L 67/10
See application file for complete search history.

(56) References Cited

U.S. PATENT DOCUMENTS

| | | | |
|---|---|---|---|
| 9,720,732 B1* | 8/2017 | Shih | G06F 9/5038 |
| 10,338,958 B1 | 7/2019 | Kamboj et al. | |
| 10,416,639 B2 | 9/2019 | Cella et al. | |
| 2009/0178047 A1* | 7/2009 | Astley | G06F 9/5038 |
| | | | 718/104 |
| 2012/0137018 A1* | 5/2012 | Uhlig | H04L 65/60 |
| | | | 709/231 |
| 2015/0363464 A1* | 12/2015 | Alves | G06F 16/24534 |
| | | | 707/765 |
| 2015/0379427 A1* | 12/2015 | Dirac | G06N 20/00 |
| | | | 706/12 |
| 2016/0098662 A1 | 4/2016 | Voss et al. | |
| 2017/0083380 A1 | 3/2017 | Bishop et al. | |
| 2019/0317826 A1 | 10/2019 | Jain et al. | |

FOREIGN PATENT DOCUMENTS

CN          104915407 A          9/2015

OTHER PUBLICATIONS

Unknown, "Apache Oozie Workflow Scheduler for Hadoop", The Apache Software Foundation, Last Published Oct. 24, 2018, 1 page, http://oozie.apache.org/.

(Continued)

*Primary Examiner* — Diem K Cao
(74) *Attorney, Agent, or Firm* — Stosch Sabo

(57) ABSTRACT

Techniques for allocating resources including receiving a first sub-stream of a data stream associated with a job and determining a dependency of a plurality of stages of the job. The techniques further include determining a metric for a second sub-stream of the data stream, where processing of the second sub-stream is completed and the metric indicates information associated with the processing of the second sub-stream. The techniques further include allocating resources for processing the first sub-stream based at least in part on the metric and the dependency.

20 Claims, 11 Drawing Sheets

(56) References Cited

OTHER PUBLICATIONS

Wu et al., "Elastic Resource Provisioning for Batched Stream Processing System in Container Cloud", Asia-Pacific Web (APWeb) and Web-Age Information Management (WAIM) Joint Conference on Web and Big Data, First Online: Aug. 3, 2017, pp. 411-426.
Das et al., "Adaptive Stream Processing using Dynamic Batch Sizing", Proceedings of the ACM Symposium on Cloud Computing, Nov. 3-5, 2014, 13 pages.
Mell et al., "The NIST Definition of Cloud Computing", Recommendations of the National Institute of Standards and Technology, Sep. 2011, 7 pages.

* cited by examiner

RESOURCE ALLOCATION

BACKGROUND

The present disclosure relates to resource allocation, and more specifically, to resource allocation for streaming computation in a cloud environment.

With the development of cloud computing and Internet of Things (IoT), streaming computation for processing streaming data is increasingly important. Streaming computation is a continuous, borderless, and transient computation that is suitable for high speed concurrent and large-scale data real-time processing scenarios. Streaming computation is widely applied to many areas such as sensor networks, finance, healthcare, transportation, and the like.

SUMMARY

In a first aspect, embodiments of the present disclosure provide a method of resource allocation. According to the method, a first sub-stream of a data stream associated with a job is received. A dependency of a plurality of stages of the job is determined. A metric for a second sub-stream of the data stream is obtained, wherein processing of the second sub-stream is completed, and the metric indicates information associated with the processing of the second sub-stream. Resources for processing the first sub-stream are allocated based at least in part on the metric and the dependency.

In another aspect, a computer-implemented system is disclosed. The system may include one or more processors; a memory coupled to at least one of the one or more processors; a set of computer program instructions stored in the memory and executed by at least one of the one or more processors to perform actions of the above method.

In yet another aspect, a computer program product is disclosed. The computer program product comprises a computer readable storage medium having program instructions embodied therewith. When executed on one or more processors, the instructions may cause the one or more processors to perform the above method.

It is to be understood that the Summary is not intended to identify key or essential features of implementations of the present disclosure, nor is it intended to be used to limit the scope of the present disclosure. Other features of the present disclosure will become easily comprehensible through the description below.

BRIEF DESCRIPTION OF THE DRAWINGS

Through the more detailed description of some embodiments of the present disclosure in the accompanying drawings, the above, and other objects, features, and advantages of the present disclosure will become more apparent. Herein, the same reference generally refers to the same components in the embodiments of the present disclosure.

Figure 1:
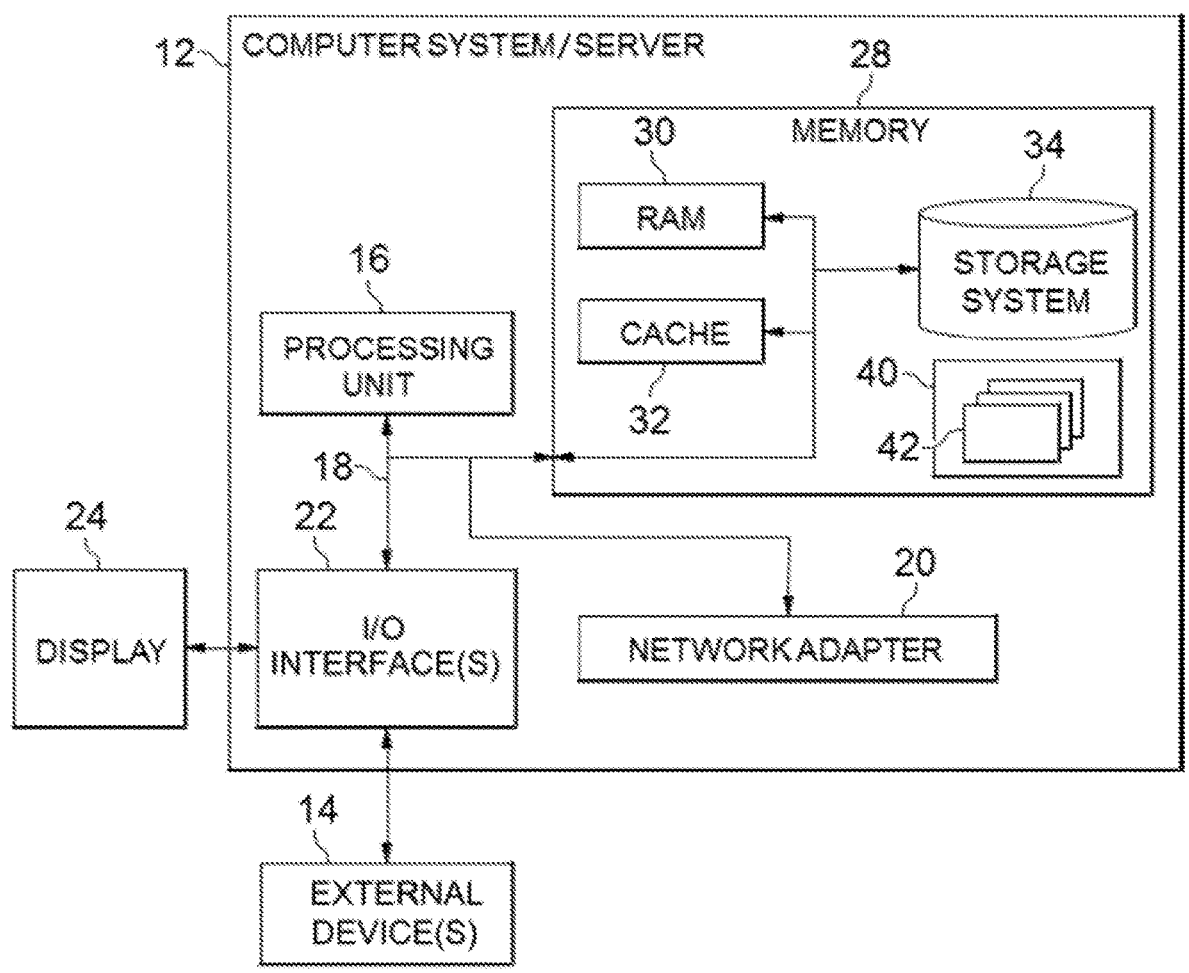
FIG. 1 depicts a cloud computing node according to some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
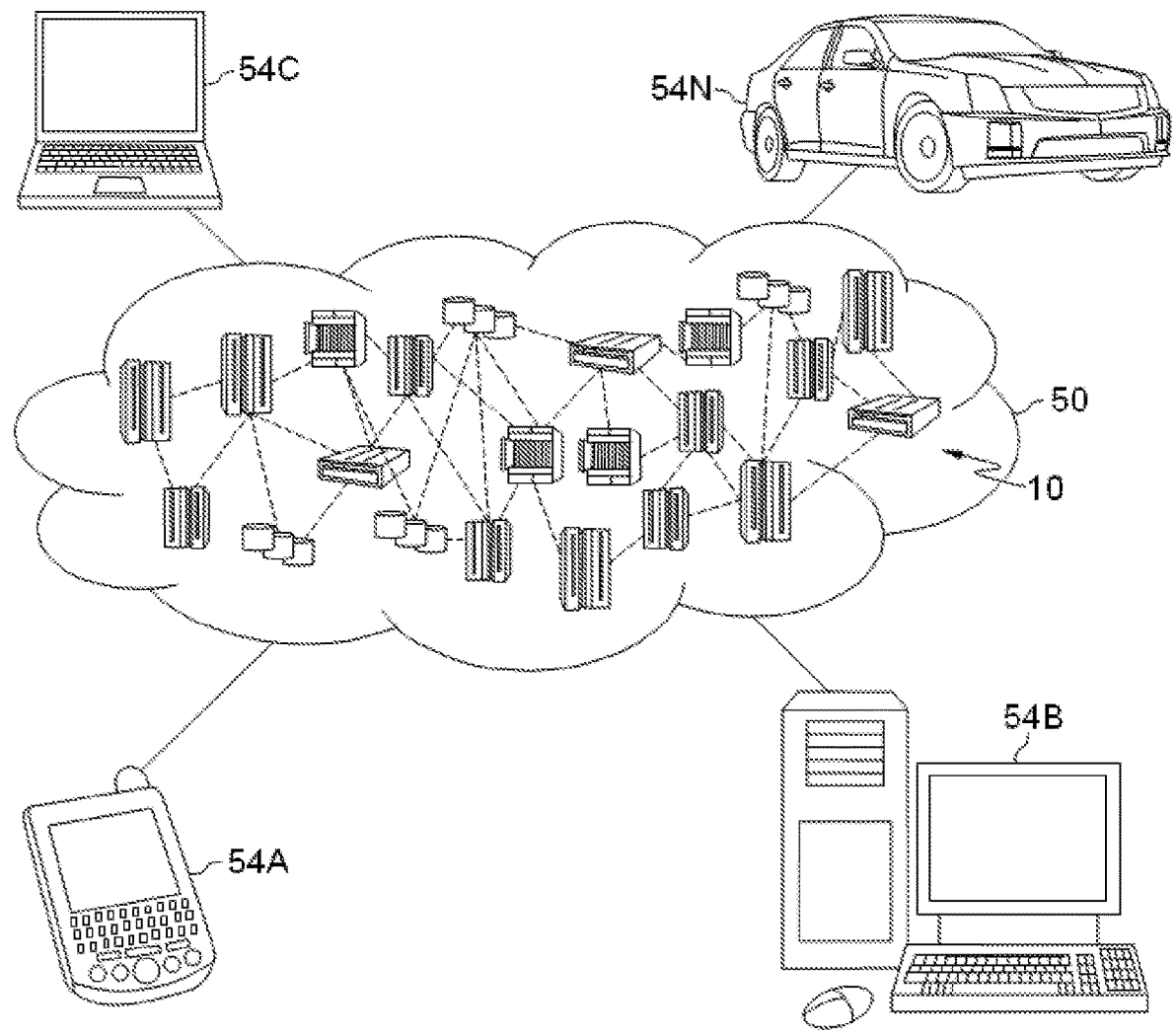
FIG. 2 depicts a cloud computing environment according to some embodiments of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
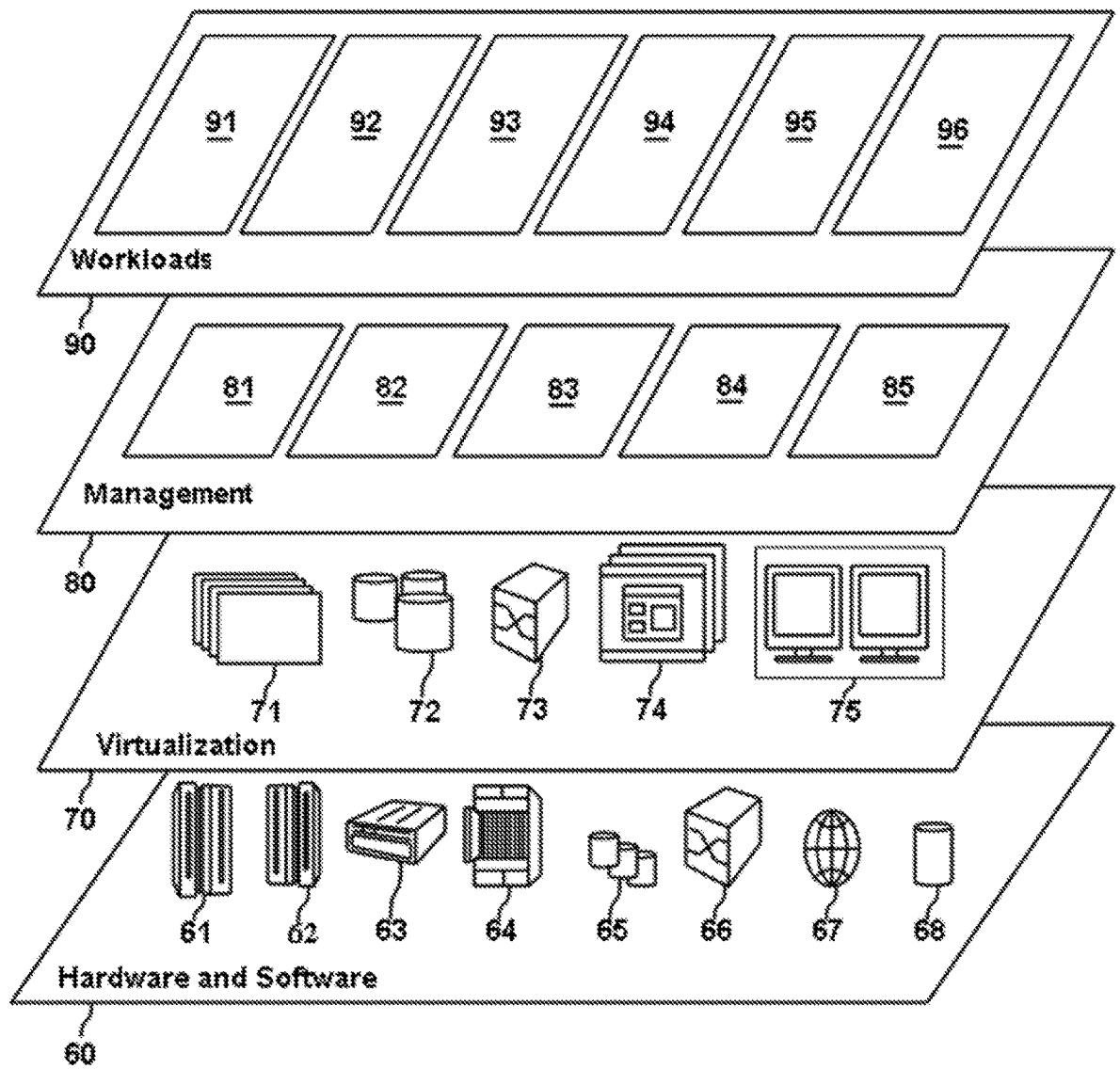
FIG. 3 depicts abstraction model layers according to some embodiments of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and resource scheduling 96. The resource scheduling 96 allocates resources for processing a current sub-stream of a data stream based at least in part on a metric associated with a previous sub-stream which has been processed and a dependency of a plurality of stages of a job for processing the data stream.

Figure 4:
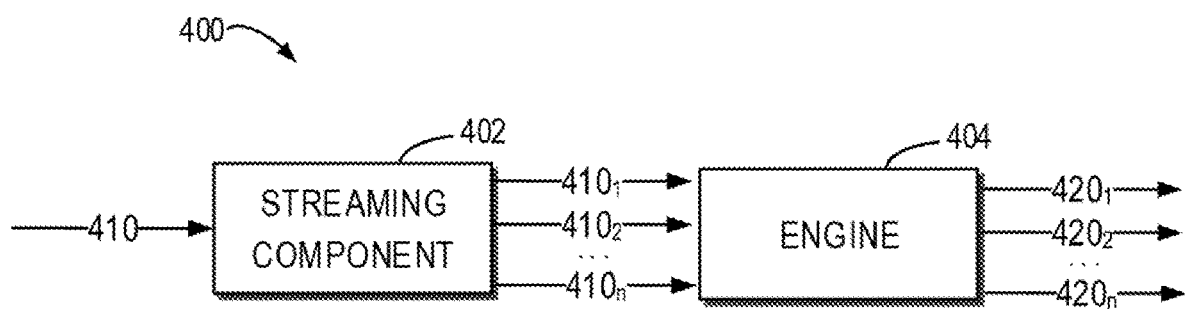
FIG. 4 depicts a block diagram of an example system for streaming computation according to some embodiments of the present disclosure.

As mentioned above, streaming computation has been widely used. FIG. 4 shows a block diagram of an example system 400 for streaming computation. As shown, a data stream 410 from various sources is input into a streaming component 402. The streaming component 402 generates, from the data stream 410, sub-streams $410_1, 410_2, \ldots, 410_n$ according to a predetermined period, where n is an integer. The predetermined period is sometimes called "sub-stream generation interval."

Each of sub-streams $410_1, 410_2, \ldots, 410_n$ is then input into an engine 404 which is configured to allocate a certain amount of processing resources (such as the processors 16 of the cloud computing nodes 10 as shown in FIGS. 1 and 2) to a job for processing the sub-stream. The job may include a plurality of stages. Each stage may correspond to a plurality of tasks, and each task corresponds to a data block associated with the sub-stream (also referred to as "data partition"). Each sub-stream may have one or more data partitions. Each task is executed by, for example, one processor. The stage is the smallest schedule unit. The sub-stream may be processed in the plurality of stages with the allocated resource. When the processing of the sub-streams is completed, the results $420_1, 420_2, \ldots, 420_n$ corresponding to the sub-streams $410_1, 410_2$ and $410_n$ are output.

Usually, there are two types of policies for the engine 404 to allocate and release resource for streaming computation, namely, a lazy policy and an aggressive policy. In the lazy policy, each sub-stream $410_1, 410_2, \ldots, 410_n$ of the data stream 410 is allocated the same amount of resource in advance. When the size of a sub-stream is large, the allocated resource is not enough to process the sub-stream within the sub-stream generation interval. As a result, the duration of the processing of the sub-stream may be longer than the sub-stream generation interval. This can delay the processing of a subsequent sub-stream. On the other hand, for a sub-stream with relatively small size, some of the allocated resource, which cannot be utilized by any other jobs in the cloud, are wasted. Thus, the resource utilization is low.

Figure 5:
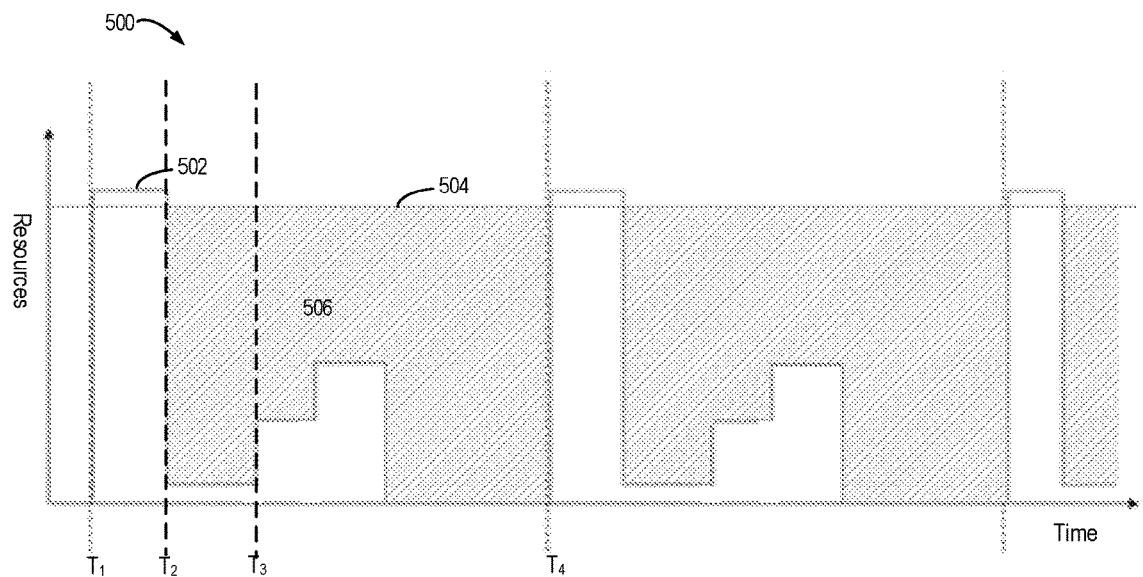
FIG. 5 depicts a graph illustrating resource allocation according to an example method.

FIG. 5 shows a graph 500 illustrating resource allocation according to the lazy policy. In this example, the resource refers to a processor, and each processor is occupied only by one task when it executes the task. The number of required processors 502 in different stages for a sub-stream is illustrated. The number of required processors 502 in a stage corresponds to the number of tasks in the stage. As shown, duration of a first stage is from time point $T_1$ to time point $T_2$, and duration of a second stage is from time point $T_2$ to time point $T_3$. The number of processors required from time point $T_1$ to time point $T_2$ is larger than that from time point $T_2$ to time point $T_3$, because the number of tasks in the first stage is larger than the number of tasks in the second stage.

According to the lazy policy, during processing of the sub-stream (i.e., from time point $T_1$ to time point $T_4$), the number of processors 504 allocated to the sub-stream is constant across time. For example, the same number of processors is allocated to the first stage and the second stage. However, since the number of required processors in the second stage is much less than the first stage, some processors allocated in the second stage are wasted. During the processing of the sub-stream, the number of wasted processors 506 at different times corresponds to the difference between the number of allocated processors 504 and the number of required processors 502.

The number of processors 502 allocated to a further sub-stream is the same as that of the sub-stream, regardless of the number of tasks associated with the further sub-stream at a different time. Wasted processors during the processing of the sub-stream and the further sub-stream cannot be used by other jobs. Thus, when the lazy policy is used, the utilization of processors is inefficient.

In the aggressive policy, resources are allocated at the beginning of each stage of a job based on the number of tasks included in the stage, and the resources are released at the end of the stage. That is, resources are allocated and released during the processing of a sub-stream, which can cause the resource fluctuation to take place too frequently. In a cloud environment, where multiple streaming jobs compete for resources, the aggressive policy may cause the resource to swing frequently among the jobs.

Figure 6:
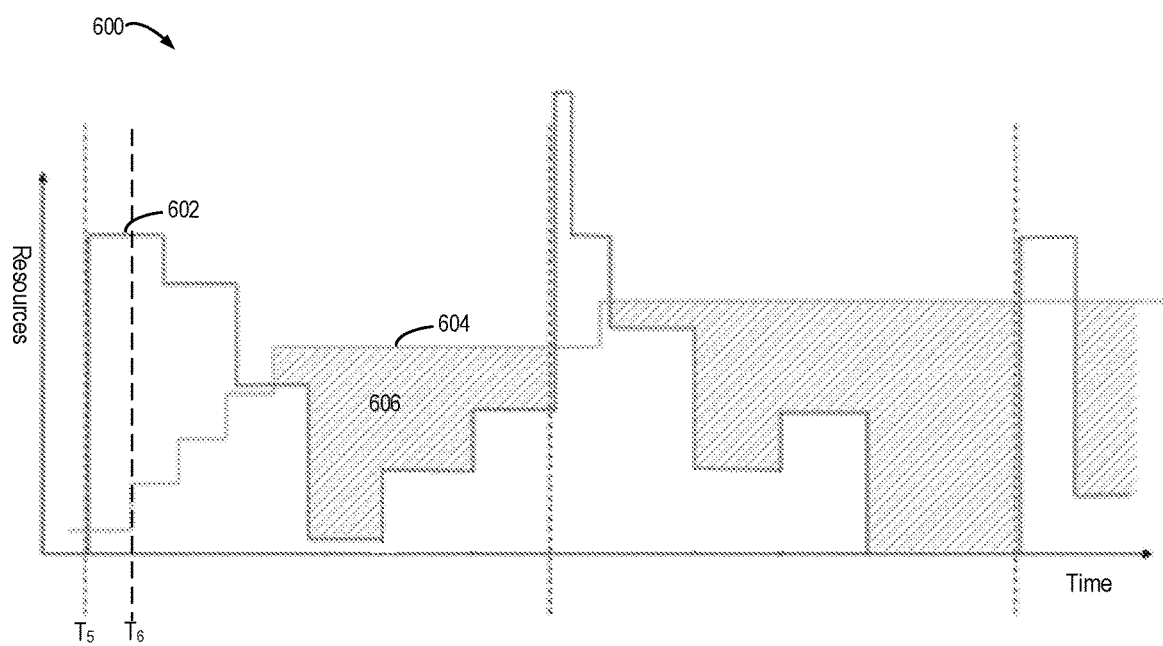
FIG. 6 depicts a graph illustrating resource allocation according to another example method.

FIG. 6 shows a graph 600 illustrating resource allocation according to the aggressive policy. In this example, the resource refers to a processor. The number of required processors 602 in different stages for a sub-stream is illustrated. The number of required processors 602 in a stage corresponds to the number of tasks of the stage. According to the aggressive policy, the number of allocated processors 604 in a stage is determined based on the number of tasks of the stage. For example, at the beginning time point $T_5$ of the stage, it is determined, based on the number of tasks of the stage, that the number of allocated processors 604 needs to be increased. Then after requesting and obtaining additional processors, the number of allocated processors 604 is increased at time point $T_6$. An interval between time point $T_5$ and time point $T_6$ is used for requesting additional processors. The number of wasted processors 606 during the processing of the sub-stream corresponds to a difference between the number of allocated processors 604 and the number of required processors 602.

The processors are allocated to a further sub-stream following the sub-stream in a similar way to the sub-stream. During the processing of a sub-stream, additional processors are constantly requested. Thus, the fluctuation of processors is frequent. Moreover, in the aggressive policy, the processors are requested quicker than they are released (if they are released at all). Thus, some allocated processors may be wasted. Therefore, the aggressive policy is also not suitable for streaming computation in a cloud.

According to some embodiments of the present disclosure, a solution of resource allocation is provided, which is suitable for streaming computation in a cloud such as Spark Streaming, especially when the sub-stream generation interval is large, and the computing logic of the job is complex.

Figure 7:
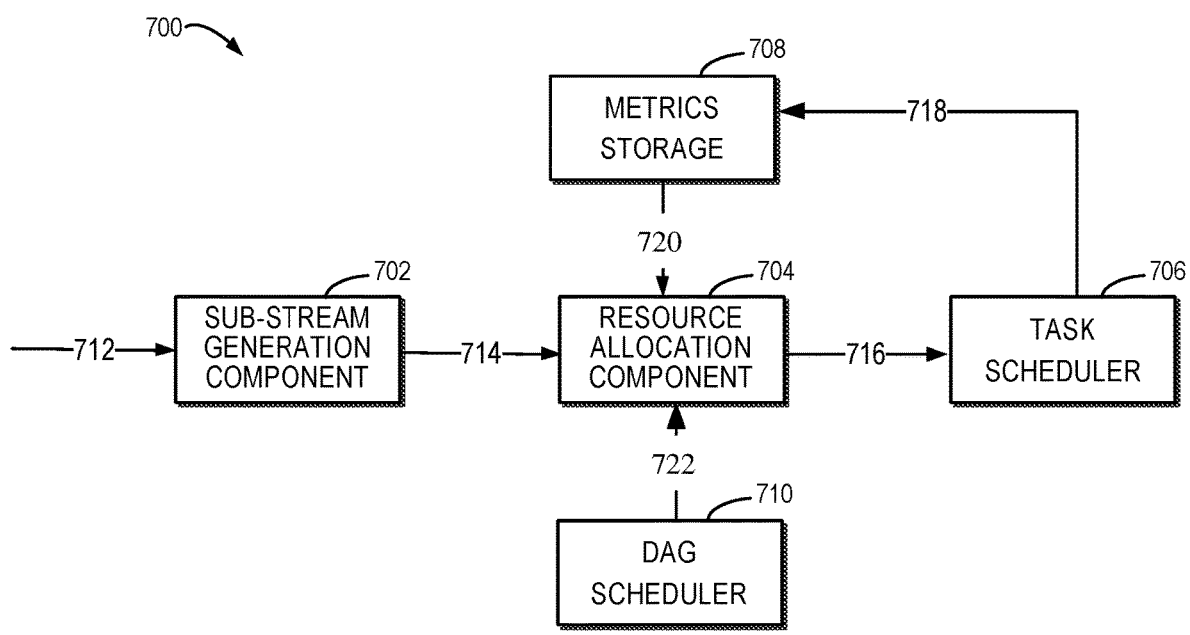
FIG. 7 depicts a block diagram of a system for allocating resources according to some embodiments of the present disclosure.

FIG. 7 depicts a block diagram of a system 700 according to some embodiments of the present disclosure. As shown, a data stream 712 is input to the system 700. The data stream 712 may come from different sources. The sources can include, but are not limited to, social networking sites, blogs, twitter accounts, emails, videos, news content, and/or phone records.

The data stream 712 may be received, for example, by a sub-stream generation component 702. The sub-stream generation component 702 is configured to generate one or more sub-streams 714 from the data stream 712 periodically. The sub-stream generation interval may be predetermined. It is desired to complete the processing of each sub-stream 714 within the sub-stream generation interval, such that a subsequent sub-stream can be processed in time.

A resource allocation component 704 is configured to allocate a suitable amount of resources 716 to the generated sub-stream 714. In some embodiments, the resource allocation component 704 may be implemented in the cloud computing node 10, for example. In order to determine the suitable amount of resources 716 to be allocated to the sub-stream 714, the resource allocation component 704 determines a dependency 722 of a plurality stages of a job associated with the data stream 712 and a metric 720 for a previous sub-stream of the sub-stream 714. The job may include a plurality of task sets, and each task set may form a stage. Each task corresponds to a partition associated with the sub-stream 714.

The dependency 722 indicates a relationship between the plurality of stages. As described above, a stage is the smallest schedule unit, and each stage may correspond to a plurality of tasks corresponding to a plurality of partitions associated with the sub-stream 714. In some embodiments, the dependency 722 may indicate parallel relationship between two or more stages. That is, these two or more stages do not depend on each other and thus can be executed at least partially in parallel. In some embodiments, the dependency 722 may indicate parent/child relationships of different stages. That is, various stages can depend on other stages, and a given stage cannot be executed until all of its parent stages are completed and feed their outputs to the given stage.

In some embodiments, the dependency 722 may be represented by a directed acyclic graph (DAG). Of course, the dependency 722 may be represented in other forms, such as a table, a tree, text, and the like.

Figure 8:
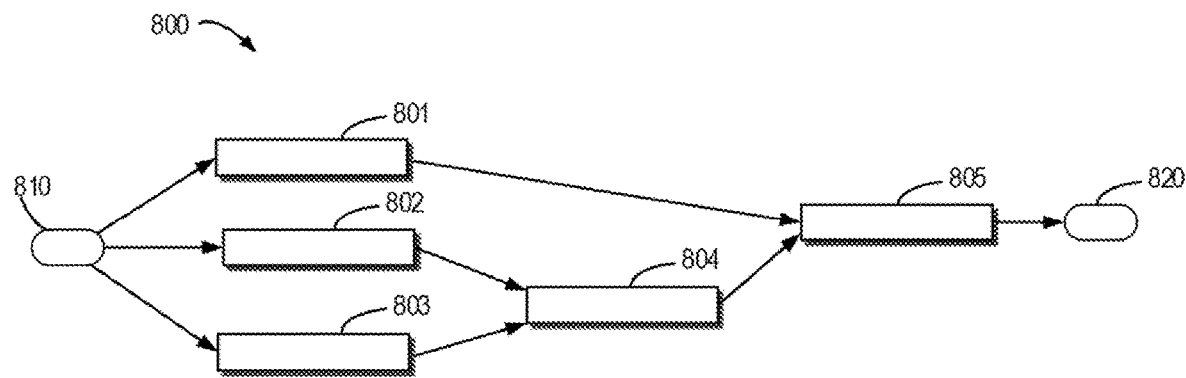
FIG. 8 depicts a diagram of a directed acyclic graph (DAG) describing a dependency of a plurality of stages of a job according to some embodiments of the present disclosure.

FIG. 8 depicts a diagram of a DAG 800 representing a dependency 722 of a plurality of stages of a job. In this example, the job includes a plurality of stages 801, 802, 803, 804 and 805. In these stages 801, 802, 803, 804 and 805, data from an input node 810 may be processed according to computing logic of the job, and the result is output to an output node 820.

The stage 801, stage 802 and stage 803 are parallel with each other. That is, one of stage 801, stage 802, and stage 803 can be executed concurrently with other stages without waiting for other stages to be completed. Stage 804 is dependent on stage 802 and stage 803. That is, stage 802 and stage 803 are parents of stage 804, and stage 804 is a child of stage 802 and stage 803. Thus stage 804 cannot begin until the completion of both of stage 802 and stage 803. Stage 805 is dependent on stage 801 and stage 804. Thus stage 805 only begins after stage 801 and stage 804 are completed.

Referring again to FIG. 7, the dependency 722 may be generated by a DAG scheduler 710 and provided to the resource allocation component 704. The plurality of stages and the dependency 722 indicating the relationship of the plurality of stages may be shared by sub-streams generated from the data stream 712. This is because in streaming computation, all sub-streams can have duplicated computing mode, where only the input data is different.

The metric 720 for the previous sub-stream indicates information associated with the processing of the previous sub-stream. Examples of the metrics 720 may include, but are not limited to, the amount of resource allocated to the previous sub-stream, duration of each stage for the previous sub-stream, the number of tasks of each stage for the previous sub-stream, ratios of resources allocated to each stage for the previous sub-stream, an input size and output size of each stage for the previous sub-stream, average execution time per task in each stage for the previous sub-stream, an average size per task in each stage for the previous sub-stream, and the like. The metric 720 may be obtained when the processing of the previous sub-stream is completed and stored in a metric storage 708.

After determining the dependency 722 and the metric 720, the resource allocation component 704 may determine values of parameters for allocating resources to the sub-stream 714. Examples of these parameters may include, but are not limited to, the expected number of tasks in each stage for the sub-stream 714, an expected output size of each stage for the sub-stream 714, an expected execution time per task in each stage for the sub-stream 714, and the like.

In some embodiments, the values of these parameters may be determined in an order specified by the dependency 722. For example, the values of parameters associated with a stage having no parent can be determined first. Then the values of parameters associated with its child stage may be determined, and so on. For example, referring to FIG. 8, values of parameters associated with stage 801, stage 802, and stage 803 may be first determined. Then values of parameters associated with stage 804 may be determined based on the values associated with stage 802 and stage 803. At last, values associated with stage 805 may be determined based on the values associated with stage 801 and stage 804.

In some embodiments, for a given stage i (N≥i≥1, where N indicates the number of stages) having no parent stage, the expected number of tasks of the stage i for the sub-stream 714 may be determined according to the following equation (1):

$$N_i = I_i / S_{partition} \tag{1}$$

Where $N_i$ indicates the expected number of tasks in the given stage i for the sub-stream 714. $I_i$ indicates an input size of the given stage i for the sub-stream 714. $S_{partition}$ indicates a size of a partition associated with the sub-stream 714, which is predetermined.

The expected output size of the stage i having no parent stage may be determined according to equation (2):

$$O_i = I_i * R_i \tag{2}$$

Where $O_i$ indicates the expected output size of stage i for the sub-stream 714. $R_i$ indicates the expected ratio between output size and input size of stage i for the sub-stream 714, which can be determined according to equation (3).

$$R_i = \Sigma_{k=1}^m R_i^k * W_i^k \tag{3}$$

Where $R_i^k$ indicates the ratio between output size and input size of stage i for the kth sub-stream before the sub-stream 714, which can be directly obtained from the metric 720. The term m indicates the number of previous sub-streams that are used. The term $W_i^k$ indicates a weight of $R_i^k$. In some embodiments, $W_i^k$ may be determined such that it is decreased when the value of k increases.

For a given stage having a parent stage, the input size of the given stage for the sub-stream 714 may be determined as the sum of output sizes of its parent stages. Then the expected number of tasks for the given stage for the sub-stream 714 may be determined based at least in part on the input size (e.g., according to equation (1)). The expected output size of the given stage for the sub-stream 714 can be determined according to equations (2) and (3).

In some embodiments, the expected execution time per task in each stage i for the sub-stream 714 may be determined according to equation (4).

$$T_{i\_current\_average} = \frac{T_{i\_previous\_average}}{S_{i\_previous\_average}} * S_{i\_current\_average} \tag{4}$$

Where $T_{i\_current\_average}$ indicates expected execution time per task in the stage i for the sub-stream 714. $T_{i\_previous\_avarage}$ indicates execution time per task in the stage i for the previous sub-stream, which can be directly obtained from the metric 720. $S_{i\_previous\_avearage}$ indicates average size per task in the stage i for the previous sub-stream, which can be directly obtained from the metric 720. $S_{i\_current\_average}$ indicates average size per task in the stage i for the current sub-stream, which can be determined based on the input size of stage i and the number of tasks in the stage i.

In this way, the values of parameters associated with each stage for the sub-stream 714 can be determined. Then these values may be used by the resource allocation component 704 to allocate resources for processing the sub-stream 714. In some embodiments, the resource allocation component 704 may determine, based on these values, a minimum amount (e.g., an optimized amount) of resources 716 for processing the sub-stream 714 within the sub-stream generation interval.

In order to determine the minimum amount of resources 716, the plurality of stages 801, 802, 803, 804 and 805 may be first placed into respective phases. A phase may contain one or more parallel stages. A stage may cross two or more phases. The phases may be determined based on a longest path of the dependency. For example, in the example shown in FIG. 8, the longest path refers to a path from input node 810 to output node 820 including the most number of stages. In this example, the longest path is a path from the input node 810 to the output node 820 including stage 803, stage 804 and stage 805, or a path including stage 802, stage 804 and stage 805.

A stage may be placed into only one phase or cross two or more phases depending on its relationship with the longest path. For example, each stage on the longest path corresponds to only one phase, and the stage is contained only in that phase. A stage on the longest path may be referred to as a "non-crossing stage". Each of the stages that are not on the longest path may be placed into the respective phase based on its relationship with the non-crossing stages. For example, if a stage that is not on the longest path has the same parent and the same child as a non-crossing stage, then it can be placed into the phase corresponding to the non-crossing stage. Such a stage may also be referred to as a "non-crossing stage" since it is contained only in one phase.

If a stage that is not on the longest path has the same parent as a first non-crossing stage on the longest path and has the same child as a second different non-crossing stage on the longest path, then the stage may cross the phases from the phase corresponding to the first non-crossing stage to the phase corresponding to the second non-crossing stage. Such a stage may be referred to as a "crossing-stage". A diagram 900 of a plurality of phases determined based on the longest path of the DAG 800 is illustrated in FIG. 9.

Figure 9:
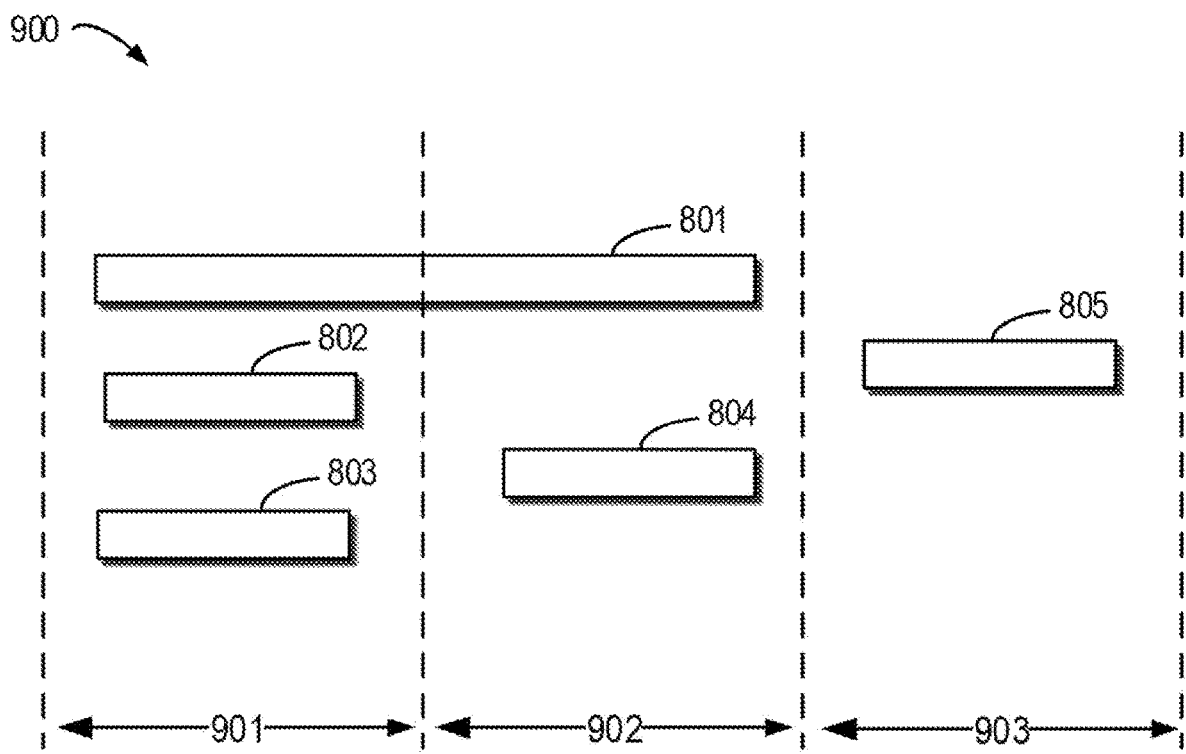
FIG. 9 depicts a diagram of a plurality of phases determined based on a dependency of a plurality of stages of a job according to some embodiments of the present disclosure.

In the example of FIG. 9, in order to facilitate the description, the longest path including stages 803, 804 and 805 is considered. It is appreciated that the longest path including stages 802, 804 and 805 will be also considered similarly. As shown, based on the longest path, three phases 901, 902 and 903 may be determined. In this example, stage 803 may be placed into phase 901, stage 804 may be placed into phase 902 and stage 805 may be placed into phase 903.

Stage 802 may be placed into phase 901, since it has the same parent and the same child as stage 803. Stage 801 may cross phase 901 and phase 902, since it has the same parent as stage 803 and the same child as stage 804. In the example, stage 803, stage 804, stage 805 and stage 802 are non-crossing stages, and stage 801 is a crossing stage.

After the plurality stages 801-805 are placed into the plurality of phases 901-903, an expected duration of each phase for the sub-stream 714 may be determined based on the determined values of parameters corresponding to the stages associated with the phase. The expected duration may be used by the resource allocation component 704 to determine whether a certain amount of resource is sufficient to process the sub-stream 714 within the predetermined period, so as to determine the minimum amount of resources 716.

In some embodiments, the expected duration of a given phase may be determined based on the expected duration of a non-crossing stage included in the phase. For example, the expected duration of phase 901 can be determined based on a maximum value of the expected duration of stage 802 and the expected duration of stage 803. The expected duration of phase 902 may be determined based on the expected duration of stage 804. The expected duration of phase 903 may be determined based on the expected duration of stage 805.

As an example, the expected duration of the non-crossing stage i may be estimated according to equation (5):

$$T_{i\_current} = T_{i\_current\_average} * N_i / (N_{resource} * R_{i\_resouce}) \qquad (5)$$

In equation (5), $T_{i\_current}$ indicates the expected duration of the non-crossing stage i for the sub stream 714 when a current amount of resource $N_{resource}$ is allocated. $N_{resource}$ may be initialized to be the amount of resource allocated to the previous sub-stream, which can be obtained directly from the metric 720. $T_{i\_current\_average}$ and $N_i$ can be determined as described above. $R_{i\_resouce}$ indicates an amount of resource allocated to the non-crossing stage i for the previous sub-stream and can be obtained directly from the metric 720.

In this way, the expected duration of each phase can be determined. The resource allocation component 704 may determine, based on the determined expected duration, whether the current amount of resource is sufficient to process the sub-stream 714 within the sub-stream generation interval. If the current amount of resource is not sufficient to process the sub-stream 714, then the resource allocation component 704 may gradually increase the current amount of resource and determine the expected duration of each phase again, until the current amount is sufficient to process the sub-stream 714. Otherwise, if the current amount of resource is sufficient, the resource allocation component 704 may gradually decrease the current amount of resource and determine the expected duration of each phase again, until the current amount of resource is insufficient to process the sub-stream 714. Thus, the minimum amount of resources for processing the sub-stream 714 within the sub-stream generation interval can be determined.

In some embodiments, if the current amount of resource is sufficient, instead of directly decreasing the current amount, the resource allocation component 704 may determine a difference between the sub-stream generation interval and an expected duration required for processing the sub-stream 714 with the current amount of resource. If the difference is below a threshold, the current amount is determined as the minimum amount. Otherwise, the current amount may be decreased until the difference is below the threshold.

In some embodiments, the resource allocation component 704 may determine whether a sum of the expected duration of the plurality of phases (i.e., a first expected duration) exceeds the sub-stream generation interval. If the first expected duration exceeds the sub-stream generation interval, this means that the stages on the longest path cannot be completed within the sub-stream generation interval, which in turn means that the current amount of resource is insufficient to process the sub-stream 714 within the sub-stream generation interval.

If the first expected duration is equal to or below the sub-stream generation interval, the resource allocation component 704 may detect whether there is a crossing-stage. If no crossing-stage is detected, this means that the current amount of resource is sufficient to process the sub-stream 714.

If a crossing stage is detected, the resource allocation component 704 may determine whether the crossing stage can be completed within expected duration of phases that the crossing-stage crosses (i.e., a third expected duration). In this regard, an expected duration of the crossing stage (i.e., a second expected duration) may be determined according to equation (5) and compared with the third expected duration.

If the second expected duration is equal to or below the third expected duration, this means that the current amount of resource is sufficient to process the sub-stream 714. If the second expected duration is greater than the third expected duration, a difference between the second expected duration and the third expected duration may be determined. Then a sum of the difference and the first expected duration may be determined and used to determine whether the current amount of resource is sufficient to process the sub-stream 714. As an example, if the sum is equal to or below the sub-stream generation interval, this means that the current amount of resource is sufficient. Otherwise, if the sum is greater than the sub-stream generation interval, this means that the current amount of resource is not sufficient.

By constantly adjusting the current amount of resource $N_{resource}$ based on the metric 720 and the dependency 722, the minimum amount of resource 716 required for processing the sub-stream 714 within the sub-stream generation interval can be determined. As used above and hereinafter, the term "minimum" is understood to mean "appropriate" such that embodiments of the present disclosure realize improved processing efficiencies relative to other methods known in the art. As used herein, the term "minimum" or similar terms (e.g., "optimized", "optimal", etc.) are not meant to be construed as conveying a single value, but rather a range of possible values where the range of possible values realize various advantages in processing efficiency associated with the present disclosure.

The determined minimum amount of resource 716 may be provided to, for example, a task scheduler 706 to schedule tasks associated with the sub-stream 714. For example, the determined minimum amount of resource may be allocated for processing the sub-stream 714. When the processing of the sub-stream 714 completes, the resource allocated to the sub-stream 714 may be released and a metric 718 indicating information associated with the sub-stream 714 may be stored in the metric storage 708 for later use.

According to embodiments of the present disclosure, the amount of resources 716 is determined based on the metric 720 for the previous sub-stream and the dependency 722. In this way, historical information associated with previous sub-streams and the relationship between the plurality of stages can be taken into account. Each sub-stream is processed with an efficient amount of resources; thus the resource utilization is high and there is less competition among different streaming jobs.

Moreover, it is possible to ensure that each sub-stream 714 can be processed within the sub-stream generation interval. Thus, subsequent sub-streams can be processed in time. In addition, it is ensured that streaming computation occupies a reasonable resource amount, and thus the streaming computation can be well integrated into the cloud environment. Furthermore, in some embodiments, resources may be allocated at the beginning of the processing of the sub-stream 714 and released at the end of the processing. Thus, the frequency and range of resource fluctuation is low. In this way, service capacity of streaming jobs can be improved in a cloud computing environment.

Figure 10:
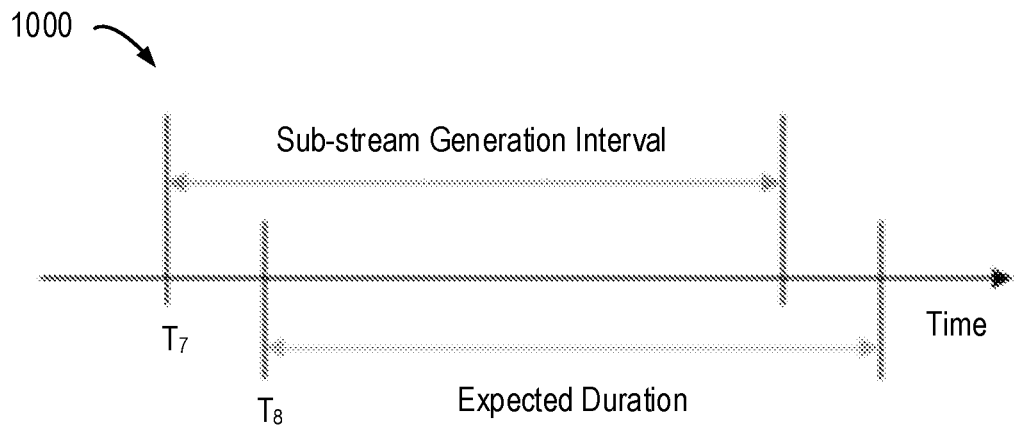
FIG. 10 depicts a timing diagram for processing a sub-stream according to some embodiments of the present disclosure.

In some embodiments, the processing of the sub-stream 714 may not begin at once when the sub-stream 714 is generated. Rather, the sub-stream 714 may be processed with a delay. During the delay, the minimum amount of resources 716 required for processing the sub-stream 714 within the sub-stream generation interval can be determined and requested. FIG. 10 depicts a timing diagram 1000 for processing sub-stream 714 according to some embodiments of the present disclosure.

As shown, the sub-stream 714 is generated at time point $T_7$. The minimum amount of resource 716 required for processing the sub-stream 714 may then be determined based on the metric 720 and the dependency 722. After the amount is determined, the sub-stream 714 begins to be processed at time $T_8$. That is, the interval between time points $T_7$ and $T_8$ may be used to determine the minimum amount of resource 716 and request the required resource. The determined amount of resource 716 can ensure that the expected duration of the processing of the sub-stream 714 is close to the sub-stream generation interval. Thus, subsequent sub-streams generated from the data stream 712 can be processed in time.

Figure 11:
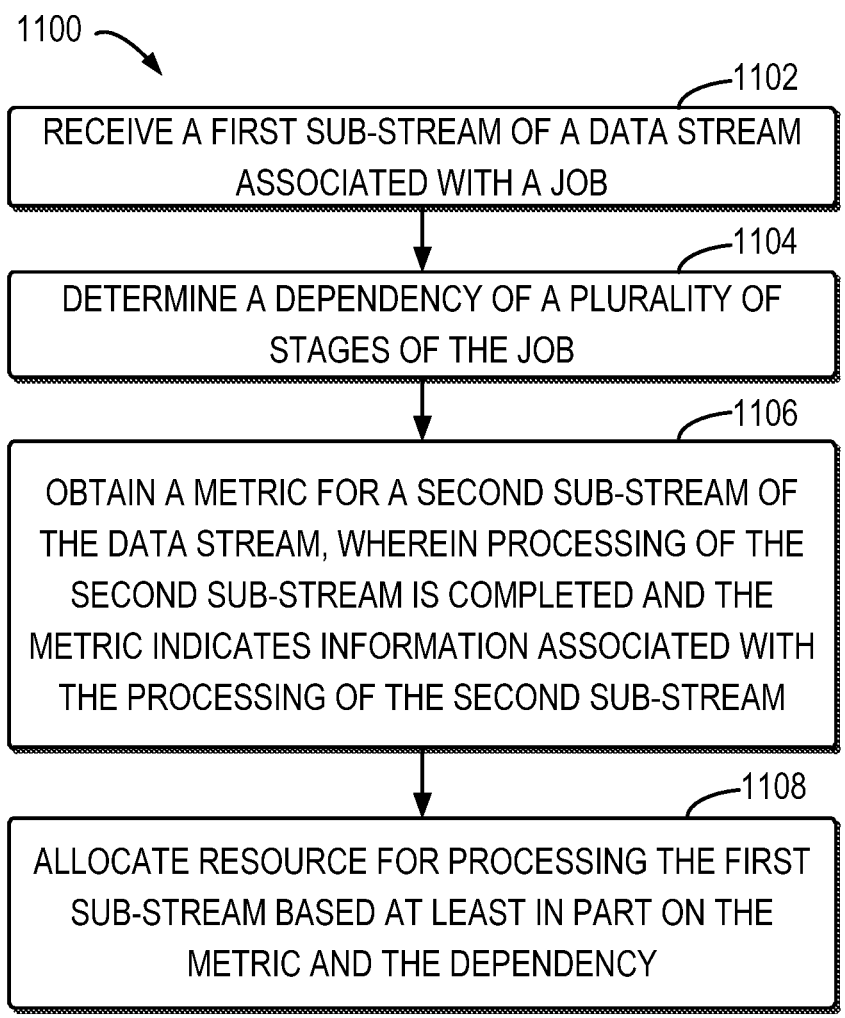
FIG. 11 depicts a flowchart of an example method of resource allocation according to some embodiments of the present disclosure.

Now referring to FIG. 11, a flowchart of a method 1100 of resource allocation according to some embodiments of the present disclosure is illustrated. The method 1100 can be performed by the resource allocation component 704 shown in FIG. 7. Of course, the method 1100 can also be performed by other components depending on the actual application of the present disclosure.

At block 1102, the resource allocation component 704 receives a first sub-stream 714 of a data stream 712 associated with a job. As described above, the data stream 712 may come from different sources. The sources may include, but are not limited to, social networking sites, blogs, twitter accounts, emails, videos, news content, and/or phone records. The first sub-stream 714 may be generated from the data stream 712 according to the sub-stream generation interval (i.e., a predetermined period).

At block 1104, the resource allocation component 704 determines a dependency 722 of a plurality of stages of the job. As described above, the dependency 722 may indicate a relationship between the plurality of stages. The plurality of stages and the dependency 722 may be predetermined based on the computation logic of the job and may be shared among different sub-streams of the data stream 712.

At block 1106, the resource allocation component 704 obtains a metric 720 for a second sub-stream of the data stream 712, where processing of the second sub-stream has been completed. The second sub-stream may comprise one or more sub-streams which have been processed previously. The metric 720 for the second sub-stream indicates information associated with the processing of the second sub-stream. In some embodiments of the present disclosure, the metric 720 for the second sub-stream may include, but is not limited to, the amount of resource allocated to the second sub-stream, a ratio between input size and output size of each stage for the second sub-stream, average execution time per task of each stage for the second sub-stream, average size per task of each stage for the second sub-stream, and/or a ratio of resource allocated to each stage for the second sub-stream.

At block 1108, the resource allocation component 704 allocates resource for processing the first sub-stream 714 based on the metric 720 and the dependency 722. In some embodiments of the present disclosure, the resource allocation component 704 may determine, based on the metric 720 and the dependency 722, an optimized amount of resources required for processing the first sub-stream within the predetermined period. The determination of the optimized amount will be described in detail with reference to FIG. 12. The resource allocation component 704 may then allocate the optimized amount of resource for processing the first sub-stream 714.

Figure 12:
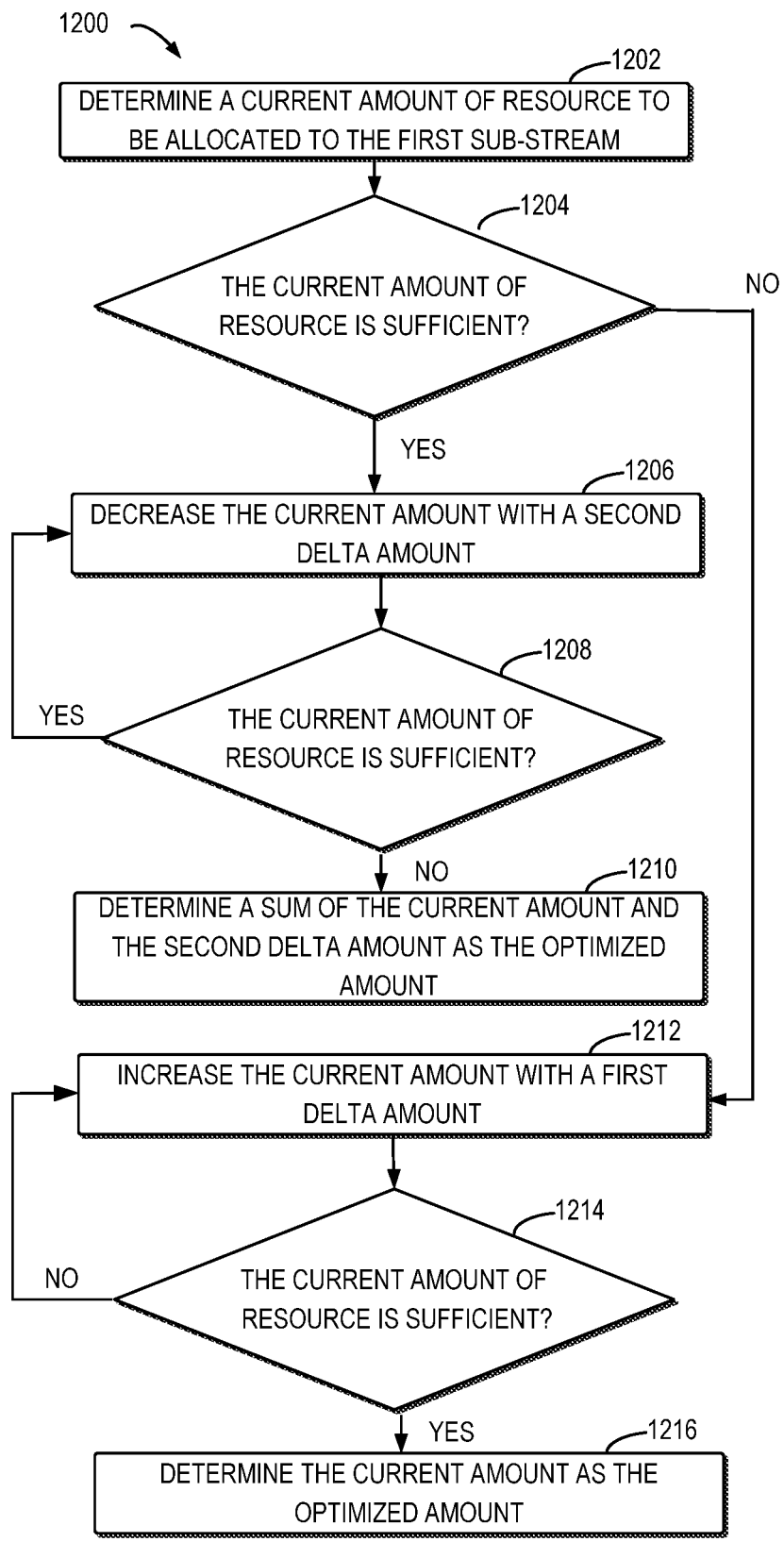
FIG. 12 depicts a flowchart of an example method for determining the amount of resources to be allocated to a sub-stream of a data stream according to some embodiments of the present disclosure.

Now referring to FIG. 12, a flowchart of a method 1200 for determining the optimized amount (e.g., an appropriate amount useful for realizing performance improvements) of resource 716 to be allocated to the first sub-stream 714 is illustrated. In some embodiments, the optimized amount may be the minimum amount of resource required for processing the first sub-stream 714 within the predetermined period. The method 1200 may be performed by the resource allocation component 704 shown in FIG. 7.

At block 1202, the resource allocation component 704 may determine a current amount of resource to be allocated to the first sub-stream 714. In some embodiments, the current amount of resource may be initialized to be an amount of resource allocated to the second sub-stream.

At block 1204, the resource allocation component 704 may determine, based on the dependency 722 and the metric 720, whether the current amount of resource is sufficient to process the first sub-stream 714 within the predetermined period. The operations of block 1204 will be described in details below with reference to FIG. 13.

If at block 1204 the resource allocation component 704 determines that the current amount of resource is sufficient to process the first sub-stream 714 within the predetermined period, then at block 1206, the resource allocation component 704 may decrease the current amount with a second delta amount. In some embodiments of the present disclosure, the second delta amount may be any suitable value.

At block 1208, the resource allocation component 704 may determine whether the current amount of resource is sufficient to process the first sub-stream 714 within the predetermined period. The operations of block 1208 are similar to those of block 1204, except that the current amount is updated. If the resource allocation component 704 determines that the current amount of resource is sufficient to process the first sub-stream 714, then the method 1200 proceeds to block 1206 to continue to decrease the current amount of resource.

If at block 1208 the resource allocation component 704 determines that the current amount of resource is not sufficient to process the first sub-stream 714 within the predetermined period, then at block 1210, the resource allocation component 704 may determine a sum of the current amount and the second delta amount as the optimized amount.

In some other embodiments, if at block 1204, the current amount of resource is determined as being sufficient, instead of directly decreasing the current amount, the resource allocation component 704 may determine whether a difference between the predetermined period and an expected duration required for processing the first-sub stream 714 with the current amount of resource is below a predetermined threshold. In response to the difference being below the predetermined threshold, the resource allocation component 704 may determine the current amount as the optimized amount. In response to the difference exceeding or equaling the predetermined threshold, the resource allocation component 704 may decrease the current amount with the second delta value, until the difference is below the predetermined threshold, and then the resource allocation component 704 may determine the current amount as the optimized amount.

If at block 1204 the resource allocation component 704 determines that the current amount of resource is not sufficient to process the first sub-stream 714, then at block 1212, the resource allocation component 704 may increase the current amount with a first delta amount. The first delta amount may be equal to or different from the second delta amount.

At block 1214, the resource allocation component 704 may determine whether the current amount of resource is sufficient to process the first sub-stream 714 within the predetermined period. The operations of block 1214 are similar to those of block 1204, except that the current amount is updated. If the resource allocation component 704 determines that the current amount of resource is not sufficient to process the first sub-stream 714, then the method 1200 proceeds to block 1212 to continue to increase the current amount.

If at block 1214 the resource component 704 determines that the current amount is sufficient to process the first sub-stream 714 within the predetermined period, then at block 1216, the resource component 704 may determine the current amount as the optimized amount.

In this way, the value of the current amount is continuously adjusted until the value is the optimized amount of resources required for processing the first sub-stream within the predetermined period. Thus, aspects of the present disclosure ensure that processing of the sub-streams can be completed with an efficient amount of resource within the predetermined period. Thus, resource utilization can be improved and the possibility of competition for resources among different jobs can be decreased.

Figure 13:
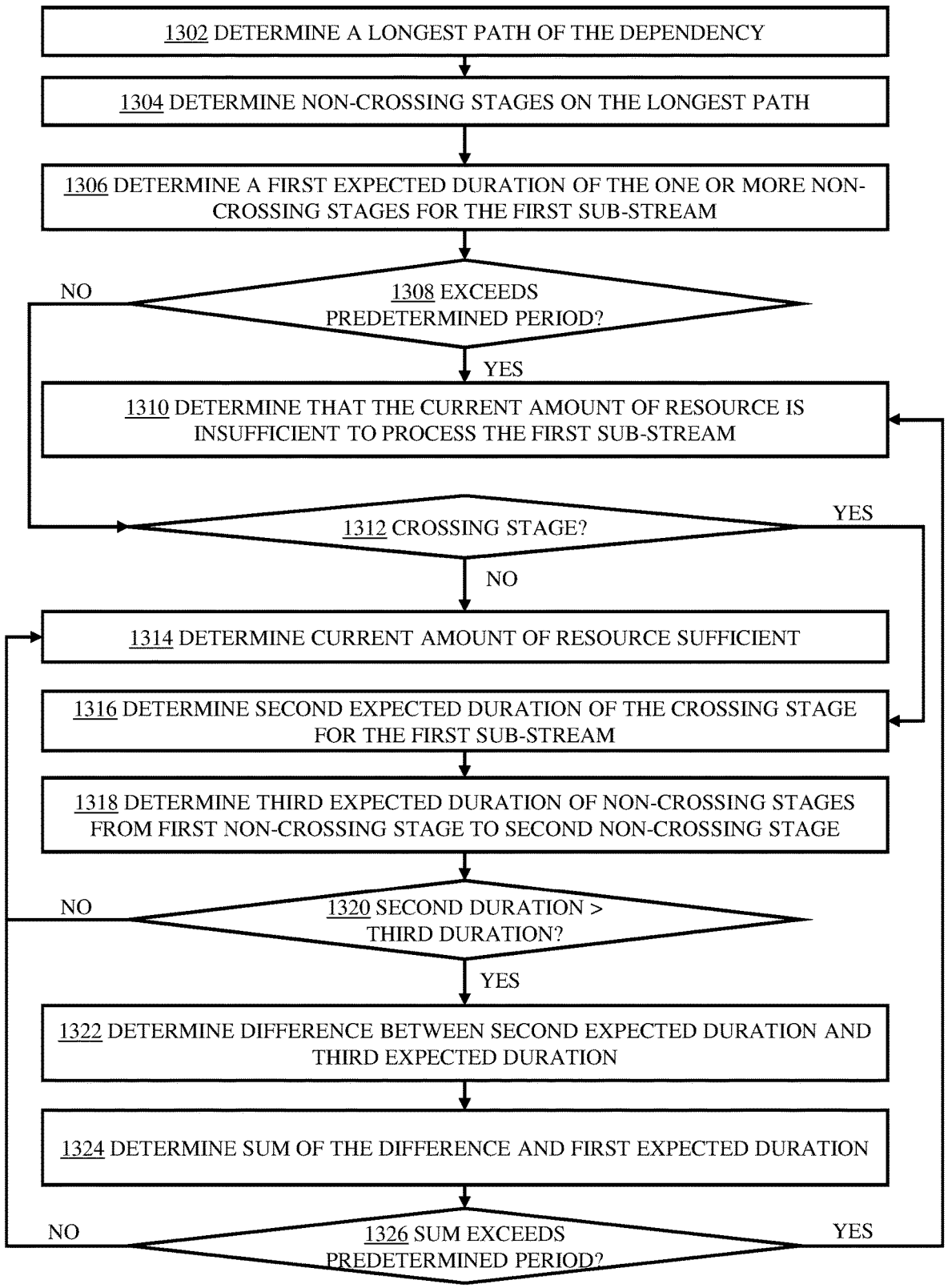
FIG. 13 depicts a flowchart of an example method for determining whether a current amount of resource is sufficient to process a sub-stream within a predetermined period according to some embodiments of the present disclosure.

FIG. 13 depicts a flow chart of a method 1300 for determining whether the current amount of resource is sufficient to process the first sub-stream 714 within a predetermined period. The method 1300 may be performed by the resource allocation component 704 shown in FIG. 7.

At block 1302, the resource allocation component 704 may determine a longest path of the dependency 722. For example, when the dependency 722 is represented by the graph 800 as shown in FIG. 8, the longest path may be determined based on the graph 800.

At block 1304, the resource allocation component 704 may determine, from the plurality of stages, one or more non-crossing stages on the longest path. For example, as shown in FIG. 8, the resource allocation component 704 may determine non-crossing stages 802, 803, 804 and 805.

At block 1306, the resource allocation component 704 may determine, based on the metric 720 and the dependency 722, a first expected duration of the one or more non-crossing stages for the first sub-stream 714.

In some embodiments, the metric 720 may include historical average execution time per task in the non-crossing stage for the second sub-stream, an average size per task in the non-crossing stage for the second sub-stream, and a ratio of resource allocated to the non-crossing stage for the second sub-stream. In this case, the resource allocation component 704 may determine the first expected duration by determining, for the first sub-stream, the number of tasks in the non-crossing stage based on the dependency 722, where each task corresponds to a data partition associated with the first sub-stream 714; determining, based on the historical average execution time per task, the average size per task and an average size per task in the non-crossing stage for the first sub-stream, expected average execution time per task in the non-crossing stage for the first sub-stream; and determining the first expected duration based on the number of tasks, the expected average execution time per task, the current amount of resource and the ratio.

In some embodiments, the resource allocation component 704 may determine the number of tasks by determining whether the non-crossing stage has a parent based on the dependency 722. If the non-crossing stage has no parent, the resource allocation component 704 may determine the number of tasks based on input of the non-crossing stage. If the non-crossing stage has at least one parent, the resource allocation component 704 may determine the number of tasks based on output of the at least one parent.

At block 1308, the resource allocation component 704 may determine whether the first expected duration exceeds the predetermined period. If the first expected duration exceeds the predetermined period, then at block 1310, the resource allocation component 704 may determine that the current amount of resource is insufficient to process the first sub-stream 714 within the predetermined period.

In some embodiments, the first expected duration is an expected duration of all non-crossing stages on the longest path. In this case, if the first expected duration is equal to or below the predetermined period, then at block 1312, the resource allocation component 704 may detect whether there is a crossing stage in the plurality of stages. The crossing stage may have a same parent as a first non-crossing stage and have a same child as a second non-crossing stage different from the first non-crossing stage. If no crossing stage is detected, then at block 1314, the resource allocation component 704 may determine that the current amount of resource is sufficient to process the first sub-stream 714 within the predetermined period.

If a crossing stage is detected, then at block 1316, the resource allocation component 704 may determine, based on the metric 720 and the dependency 722, a second expected duration of the crossing stage for the first sub-stream 714 with the current amount of resources.

At block 1318, the resource allocation component 704 may determine, based on the metric 720 and the dependency 722, a third expected duration of non-crossing stages on the longest path from the first non-crossing stage to the second non-crossing stage for the first sub-steam 714.

At block 1320, the resource allocation component 704 may determine whether the second expected duration exceeds the third expected duration. If the second expected duration is equal to or below the third expected duration, this means that the current amount of resource is sufficient to process the first sub-stream 714.

If the second expected duration exceeds the third expected duration, then at block 1322, the resource allocation component 704 may determine a difference between the second expected duration and the third expected duration. At block 1324, the resource allocation component 704 may determine a sum of the difference and the first expected duration. At block 1326, the resource allocation component 704 may determine whether the sum exceeds the predetermined period. If the sum exceeds the predetermined period, then at block 1310, the resource allocation component 704 may determine that the current amount of resource is insufficient to process the first sub-stream 714. Otherwise, if the sum is equal to or below the predetermined period, then at block 1314, the resource allocation component 704 may determine that the current amount of resource is sufficient to process the first sub-stream 714.

Figure 14:
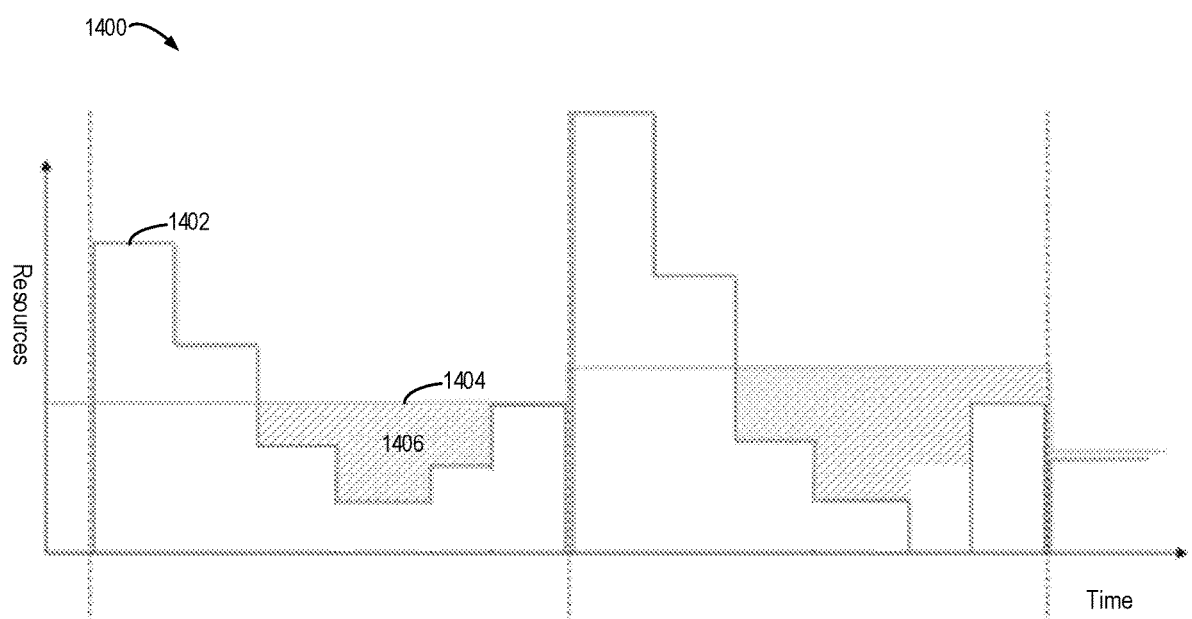
FIG. 14 depicts a graph illustrating resource allocation according to some embodiments of the present disclosure.

FIG. 14 depicts a diagram 1400 illustrating efficient resource allocation according to some embodiments of the present disclosure. As shown, the amount of required resources 1402 at different times for a sub-stream and the amount of allocated resources 1404 at different time for the sub-stream are illustrated, respectively. The amount of allocated resources 1404 is constant during the processing of the sub-stream. The resource is allocated at the beginning of the processing of the sub-stream and released at the end of the processing of the sub-stream. Thus, the frequency and range of resource fluctuation is small. Furthermore, the amount of allocated resources 1404 is determined to be a minimum amount of resources for processing the sub-stream within the sub-stream generation interval. Thus, the amount of wasted resources 1406, which corresponds to a difference between the amount of allocated resources 1404 and the amount of required resources 1402, is less than the lazy policy and aggressive policy. Therefore, the resource utilization is high and there is less competition for the resources among different streaming jobs.

It should be noted that the processing of allocating resources according to embodiments of this disclosure could be implemented by computer system/server 12 of FIG. 1.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    receiving, by one or more processing units, a first sub-stream of a data stream associated with a job;
    determining, by one or more processing units, a dependency of a plurality of stages of the job;
    obtaining, by one or more processing units, a metric for a second sub-stream of the data stream, wherein processing of the second sub-stream is completed and the metric indicates information associated with the processing of the second sub-stream; and
    allocating, by one or more processing units, resources for processing the first sub-stream based at least in part on the metric and the dependency.

2. The method of claim 1, wherein allocating the resources comprises:
    determining, by one or more processing units, a first amount of resources required for processing the first sub-stream within a predetermined period based at least in part on the metric and the dependency; and
    allocating, by one or more processing units, the first amount of resources for processing the first sub-stream.

3. The method of claim 2, wherein determining the first amount comprises:
    determining, by one or more processing units, a current amount of resources to be allocated to the first sub-stream; and
    determining, by one or more processing units, whether the current amount of resources is sufficient to process the first sub-stream within the predetermined period based at least in part on the dependency and the metric.

4. The method of claim 3, wherein determining the first amount further comprises:
    in response to determining that the current amount of resources is insufficient, iteratively increasing, by one or more processing units, the current amount with a first delta amount, until the current amount of resources is sufficient to process the first sub-stream within the predetermined period; and
    determining, by one or more processing units, the current amount as the first amount.

5. The method of claim 3, wherein determining the first amount comprises:

in response to determining that the current amount of resources is sufficient, iteratively decreasing, by one or more processing units, the current amount of resources with a second delta amount, until the current amount of resources is insufficient to process the first sub-stream within the predetermined period; and determining, by one or more processing units, a sum of the current amount and the second delta amount as the first amount.

6. The method of claim 5, wherein determining the first amount further comprises:

in response to determining that the current amount of resources is sufficient, determining, by one or more processing units, a difference between the predetermined period and an expected duration required for processing the first sub-stream with the current amount of resources; and in response to the difference being below a predetermined threshold, determining, by one or more processing units, the current amount as the first amount.

7. The method of claim 5, wherein determining the first amount further comprises:

in response to determining that the current amount of resources is sufficient, determining, by one or more processing units, a difference between the predetermined period and an expected duration required for processing the first sub-stream with the current amount of resources;

in response to the difference being above or equal to a predetermined threshold, iteratively decreasing, by one or more processing units, the current amount of resources with the second delta amount, until the difference between the predetermined period and the expected duration required for processing the first sub-stream with the current amount of resources is below the predetermined threshold; and determining, by one or more processing units, the current amount as the first amount.

8. The method of claim 3, wherein determining whether the current amount of resources is sufficient comprises:

determining, by one or more processing units, a longest path of the dependency;

determining, by one or more processing units, one or more non-crossing stages on the longest path from the plurality of stages; and determining, by one or more processing units, a first expected duration of the one or more non-crossing stages for the first sub-stream based at least in part on the metric and the dependency, wherein the first expected duration is an expected duration of all non-crossing stages on the longest path.

9. The method of claim 8, wherein determining whether the current amount of resources is sufficient further comprises:

in response to the first expected duration exceeding the predetermined period, determining, by one or more processing units, that the current amount of resources is insufficient.

10. The method of claim 8, wherein determining whether the current amount of resources is sufficient further comprises:

in response to the first expected duration being less than or equal to the predetermined period, detecting, by one or more processing units, that there is not a crossing stage in the plurality of stages, the crossing stage having a same parent as a first non-crossing stage and having a same child as a second non-crossing stage, wherein the first non-crossing stage is different from the second-non-crossing stage; and in response to detecting that there is not crossing stage in the plurality of stages, determining, by one or more processing units, that the current amount of resources is sufficient.

11. The method of claim 8, wherein determining whether the current amount of resources is sufficient further comprises:

in response to the first expected duration being less than or equal to the predetermined period, detecting, by one or more processing units, that there is a crossing stage in the plurality of stages, the crossing stage having a same parent as a first non-crossing stage and having a same child as a second non-crossing stage, wherein the first non-crossing stage is different from the second-non-crossing stage;

in response to detecting the crossing stage in the plurality of stages, determining, by one or more processing units, a second expected duration of the crossing stage for the first sub-stream based at least in part on the metric and the dependency; and determining, by one or more processing units, a third expected duration of non-crossing stages on the longest path from the first non-crossing stage to the second non-crossing stage for the first sub-steam based at least in part on the metric and the dependency.

12. The method of claim 11, wherein determining whether the current amount of resources is sufficient further comprises:

in response to the second expected duration being equal to or below the third expected duration, determining, by one or more processing units, that the current amount of resources is sufficient.

13. The method of claim 11, wherein determining whether the current amount of resources is sufficient further comprises:

in response to the second expected duration exceeding the third expected duration, determining, by one or more processing units, a difference between the second expected duration and the third expected duration; and determining, by one or more processing units, a sum of the difference and the first expected duration.

14. The method of claim 13, wherein determining whether the current amount of resources is sufficient further comprises:

in response to the sum being equal to or below the predetermined period, determining, by one or more processing units, that the current amount of resources is sufficient.

15. The method of claim 13, wherein determining whether the current amount of resources is sufficient further comprises:

in response to the sum being greater than the predetermined period, determining, by one or more processing units, that the current amount of resources is insufficient.

16. The method of claim 8, wherein the metric includes a historical average execution time per task in the non-crossing stage for the second sub-stream, a historical average size per task in the non-crossing stage for the second sub-stream, and a ratio of resources allocated to the non-crossing stage for the second sub-stream; and wherein determining the first expected duration comprises:

determining, by one or more processing units, for the first sub-stream, a number of tasks in the non-crossing stage, wherein each of the tasks corresponds to a data partition associated with the first sub-stream;

determining, by one or more processing units, an expected average execution time per task in the non-crossing stage for the first sub-stream based at least in part on the historical average execution time per task, the historical average size per task, and an average size per task in the non-crossing stage for the first sub-stream; and determining, by one or more processing units, the first expected duration based at least in part on the number of tasks, the expected average execution time per task, the current amount of resources, and the ratio.

17. The method of claim 16, wherein determining the number of tasks comprises:

determining, by one or more processing units, whether the non-crossing stage has a parent based on the dependency; and in response to the non-crossing stage having no parent, determining, by one or more processing units, the number of tasks in the non-crossing stage based on input of the non-crossing stage.

18. The method of claim 16, wherein determining the number of tasks comprises:

determining, by one or more processing units, whether the non-crossing stage has a parent based on the dependency; and in response to the non-crossing stage having at least one parent, determining, by one or more processing units, the number of tasks in the non-crossing stage based on output of the at least one parent.

19. A system comprising:

a processing unit; and a memory coupled to the processing unit and storing instructions thereon, the instructions, when executed by the processing unit, performing acts including:

receiving a first sub-stream of a data stream associated with a job;

determining a dependency of a plurality of stages of the job;

obtaining a metric for a second sub-stream of the data stream, wherein processing of the second sub-stream is completed and the metric indicates information associated with the processing of the second sub-stream; and allocating resources for processing the first sub-stream based at least in part on the metric and the dependency.

20. A computer program product comprising a computer-readable storage medium having program instructions embodied therewith, wherein the computer-readable storage medium is not a transitory signal per se, the program instructions executable by a processor to cause the processor to perform a method comprising:

receiving a first sub-stream of a data stream associated with a job;

determining a dependency of a plurality of stages of the job;

obtaining a metric for a second sub-stream of the data stream, wherein processing of the second sub-stream is completed and the metric indicates information associated with the processing of the second sub-stream; and allocating resources for processing the first sub-stream based at least in part on the metric and the dependency.

* * * * *